United States Patent
Goto (10) Patent No.: US 12,244,924 B2
(45) Date of Patent: Mar. 4, 2025

(54) INFORMATION PROCESSING DEVICE AND INFORMATION PROCESSING METHOD

(71) Applicant: SONY GROUP CORPORATION, Tokyo (JP)

(72) Inventor: Shuichi Goto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 248 days.

(21) Appl. No.: 17/758,916

(22) PCT Filed: Jan. 24, 2020

(86) PCT No.: PCT/JP2020/002481
§ 371 (c)(1),
(2) Date: Dec. 29, 2022

(87) PCT Pub. No.: WO2021/149238
PCT Pub. Date: Jul. 29, 2021

(65) Prior Publication Data
US 2023/0128043 A1  Apr. 27, 2023

(51) Int. Cl.
| | |
|---|---|
| H04N 23/67 | (2023.01) |
| G03B 13/36 | (2021.01) |
| G06T 7/20 | (2017.01) |
| G06T 7/62 | (2017.01) |
| G06V 10/25 | (2022.01) |
| G06V 10/74 | (2022.01) |
| H04N 23/61 | (2023.01) |

(52) U.S. Cl.
CPC .......... *H04N 23/675* (2023.01); *G03B 13/36* (2013.01); *G06T 7/20* (2013.01); *G06T 7/62* (2017.01);
(Continued)

(58) Field of Classification Search
CPC ................. G02B 7/38; G03B 13/36; G06T 2207/10028; G06T 7/20; G06T 7/62;
(Continued)

(56) References Cited

U.S. PATENT DOCUMENTS

| | | |
|---|---|---|
| 5,227,830 A | 7/1993 | Yoshihara et al. |
| 2008/0252773 A1 | 10/2008 | Oishi |

(Continued)

FOREIGN PATENT DOCUMENTS

| | | |
|---|---|---|
| JP | 3-167536 A | 7/1991 |
| JP | 2008-035125 A | 2/2008 |

(Continued)

OTHER PUBLICATIONS

International Search Report and Written Opinion of PCT Application No. PCT/JP2020/002481, issued on Apr. 14, 2020, 11 pages of ISRWO.

*Primary Examiner* — Amy R Hsu
(74) *Attorney, Agent, or Firm* — CHIP LAW GROUP (57) ABSTRACT

Provided is an information processing device including an image capture unit that captures an image of a subject and converts the image into digital data to generate a captured image, a calculation unit that calculates, for each predetermined area of the captured image, a probability that the subject included in the predetermined area is a main subject desired to be captured by a camera operator, a determination unit that determines the predetermined area in which the probability exceeds a predetermined threshold as a valid data area and that determines a main subject area based on the valid data area, and a focusing unit that focuses on the determined main subject area. Accordingly, it is possible to appropriately bring the main subject into focus.

14 Claims, 9 Drawing Sheets (52) U.S. Cl.
CPC ............ *G06V 10/25* (2022.01); *G06V 10/761* (2022.01); *H04N 23/61* (2023.01); *G06T 2207/10028* (2013.01)

(58) Field of Classification Search
CPC ...... G06V 10/25; G06V 10/761; H04N 23/61; H04N 23/675; H04N 23/959
See application file for complete search history.

(56) References Cited

U.S. PATENT DOCUMENTS

| | | | | |
|---|---|---|---|---|
| 2015/0116517 A1* | 4/2015 | Kinoshita | .............. | H04N 23/61 |
| | | | | 348/208.6 |
| 2015/0279012 A1* | 10/2015 | Brown | ...................... | G06T 5/50 |
| | | | | 382/284 |
| 2015/0294181 A1 | 10/2015 | Yamanaka et al. | | |
| 2016/0044245 A1 | 2/2016 | Tsubaki | | |
| 2018/0184006 A1* | 6/2018 | Takagi | ................. | H04N 23/632 |
| 2020/0120262 A1 | 4/2020 | Kinoshita | | |
| 2021/0127068 A1* | 4/2021 | Nishiyama | ................ | G06T 7/73 |

FOREIGN PATENT DOCUMENTS

| | | |
|---|---|---|
| JP | 2008-262001 A | 10/2008 |
| JP | 2010-087599 A | 4/2010 |
| JP | 2010-107664 A | 5/2010 |
| JP | 2014-119725 A | 6/2014 |
| JP | 2015-204023 A | 11/2015 |
| JP | 2016-038415 A | 3/2016 |
| JP | 2017-005738 A | 1/2017 |
| WO | WO-2014109125 A1 | 7/2014 |

* cited by examiner

EXTRACT MAIN SUBJECT

DETECT RECTANGULAR AREA INSCRIBED IN VALID DATA AREA

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/002481 filed on Jan. 24, 2020. Each of the above-referenced applications is hereby incorporated herein by reference in its entirety.

FIELD

The present disclosure relates to an information processing device, an information processing method, and an information processing program.

BACKGROUND

Auto Focus (AF) functions for automatically focusing a camera, a camcorder, or the like are often provided in terminals having camera functions, such as mobile phones or smartphones. For example, some AF functions are configured so that a user touches, for focusing, on a portion of a subject (hereinafter, referred to as "main subject") that is previewed on a screen of a smartphone or the like and on which the user desires to focus. Meanwhile, when the user does not clearly indicate the main subject to the camera, center-weighted AF that automatically focuses on the subject near the center of the screen is mainly adopted.

CITATION LIST

Patent Literature

Patent Literature 1: JP 2017-005738 A

SUMMARY

Technical Problem

However, the center-weighted AF has a problem that the main subject cannot be appropriately brought into focus, when the main subject is off the center, when nearby and faraway subjects are positioned near the center, or the like.

Therefore, the present disclosure proposes an information processing device, an information processing method, and an information processing program that are configured to appropriately bring the main subject into focus.

Solution to Problem

According to the present disclosure, an information processing device is provided that includes: an image capture unit that captures an image of a subject and converts the image into digital data to generate a captured image; a calculation unit that calculates, for each predetermined area of the captured image, a probability that the subject included in the predetermined area is a main subject desired to be captured by a camera operator; a determination unit that determines the predetermined area in which the probability exceeds a predetermined threshold as a valid data area and determines a main subject area based on the valid data area; and a focusing unit that focuses on the determined main subject area.

Moreover, according to the present disclosure, a method for performing, by an information processing device, is provided that includes: capturing an image of a subject and converts the image into digital data to generate a captured image; calculating, for each predetermined area of the captured image, a probability that the subject included in the predetermined area is a main subject desired to be captured by a camera operator; determining the predetermined area in which the probability exceeds a predetermined threshold as a valid data area; determining a main subject area based on the valid data area; and focusing on the determined main subject area.

Moreover, according to the present disclosure, a program is provided that causes an information processing device to perform a process including: capturing an image of a subject and converts the image into digital data to generate a captured image; calculating, for each predetermined area of the captured image, a probability that the subject included in the predetermined area is a main subject desired to be captured by a camera operator; determining the predetermined area in which the probability exceeds a predetermined threshold as a valid data area; determining a main subject area based on the valid data area; and focusing on the determined main subject area.

DESCRIPTION OF EMBODIMENTS

The present embodiment will be described in detail below with reference to the drawings. Note that in the present description and the drawings, portions having substantially the same configurations are designated by the same reference numerals, and redundant description thereof will be omitted.

Note that the description will be given in the following order.
1. Embodiment
1.1. Example of functional configuration
1.2. Details of functions
1.3. Functional Flow
2. Example of hardware configuration
3. Conclusion

1. EMBODIMENT

1.1. Example of Functional Configuration

Next, an example of the functional configuration of an information processing device 10 according to the present embodiment will be described. The information processing device 10 may be a digital camera or a digital camcorder, or may be a mobile terminal such as a smartphone or tablet personal computer (PC).

Figure 1:
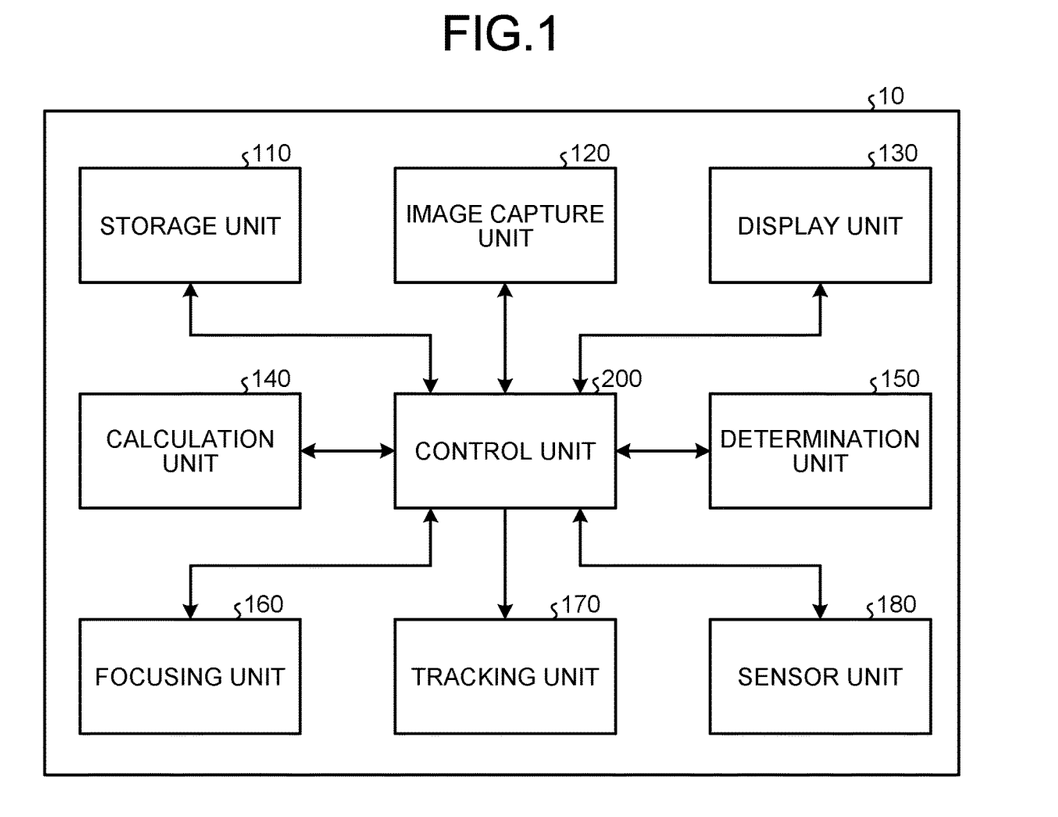
FIG. 1 is a block diagram illustrating an example of the functional configuration of an information processing device 10 according to the present embodiment.

FIG. 1 is a block diagram illustrating an example of the functional configuration of an information processing device 10 according to the present embodiment. As illustrated in FIG. 1, the information processing device 10 according to the present embodiment includes a storage unit 110, an image capture unit 120, a display unit 130, a calculation unit 140, a determination unit 150, a focusing unit 160, a tracking unit 170, a sensor unit 180, and a control unit 200.

(Storage Unit 110)

The storage unit 110 according to the present embodiment is a storage area for temporarily or permanently storing various programs and data. For example, the storage unit 110 may store programs and data for performing various functions of the information processing device 10. In a specific example, the storage unit 110 may store a program for running a camera application, a learning model for determining a main subject, management data for managing various settings, and the like. In addition, image capture parameters (e.g., various parameters for capturing an image, such as focusing and exposure) and the like input by the user via a user interface (UI) of the camera application may be stored. As a matter of course, the above description is merely examples, and the type of data stored in the storage unit 110 is not particularly limited.

(Image Capture Unit 120)

The image capture unit 120 according to the present embodiment captures a moving image or picture under control by the control unit 200. The image capture unit 120 includes an imaging element, a focus ring, a zoom lens, and the like. The moving image or picture captured by the image capture unit 120 are converted into digital data and stored in the storage unit 110. Note that the moving image captured by the image capture unit 120 is stored together with voice and environmental sound collected during image capture by a voice input unit (not illustrated) such as a microphone. Furthermore, the moving image captured by the image capture unit 120 and stored in the storage unit 110 includes a moving image captured while a recording is made, and a moving image captured, while the recording is not made, for preview of the subject on the display unit 130 or the like. The former moving image is displayed on the display unit 130, temporarily stored in a Random Access Memory (RAM), and then stored in a Read Only Memory (ROM). The latter moving image is also temporarily stored in the RAM, but when the RAM becomes full, an older moving image is deleted and is not stored in the ROM.

(Display Unit 130)

The display unit 130 according to the present embodiment displays various visual information under the control by the control unit 200. The visual information represents, for example, the UI of the camera application, the subject captured by the image capture unit 120, and the like. For this purpose, the display unit 130 includes various display devices such as a Liquid Crystal Display (LCD) device and an Organic Light Emitting Diode (OLED) display device.

(Calculation Unit 140)

The calculation unit 140 according to the present embodiment calculates, for each predetermined area of an image (captured image) of one frame of the moving image captured by the image capture unit 120, the probability (main subject degree: e.g., 0 to 1) that a subject included in the predetermined area is the main subject. Here, the main subject is an object (object) that the camera operator desires to capture. In the present embodiment, for example, using a learning model that uses, as training data, a plurality of sets of an image obtained by capturing an object that can be the main subject and a mask image in which a main subject area is masked, one main subject is determined from the captured moving image, and the determined main subject is brought into focus.

(Determination Unit 150)

The determination unit 150 according to the present embodiment determines, as a valid data area, the predetermined area having a main subject degree equal to or larger than a predetermined threshold (e.g., 0.7), and determines one main subject area on the basis of the valid data area. A method of determining the main subject area on the basis of the valid data area will be described later.

(Focusing Unit 160)

The focusing unit 160 according to the present embodiment focuses on the main subject area determined by the determination unit 150. When the main subject area is not determined, the focusing unit 160 focuses on a center area of the captured image (center-weighted AF).

(Tracking Unit 170)

The tracking unit 170 according to the present embodiment tracks the main subject determined by the determination unit 150. The tracking unit 170 tracks the main subject, and when the main subject is out of the frame or when the main subject degree of the main subject is significantly decreases in the main subject area where the main subject is captured, the determination unit 150 determines another main subject area.

(Sensor Unit 180)

The sensor unit 180 according to the present embodiment measures a distance (also referred to as depth or Depth information) to the subject. The sensor unit 180 includes, for example, a Time of Flight (ToF) sensor and the like.

(Others)

Although not illustrated, the information processing device 10 may include a voice output unit that outputs various sounds and voice, in addition to the above description. The voice output unit outputs sound or voice, for example, according to the situation of the camera application under the control by the control unit 200 (e.g., emits sound at the start and end of image capturing). For this purpose, the voice output unit includes a speaker and an amplifier.

(Control Unit 200)

The control unit 200 according to the present embodiment controls each configuration included in the information processing device 10. In addition, one of the characteristics of the control unit 200 is to control image capture with camera. The control of image capture includes adjusting the image capture parameters, operating the focus ring and the like of the image capture unit 120 on the basis of the image capture parameters. Details of the functions of the control unit 200 will be described later.

The example of the functional configuration of the information processing device 10 according to the present embodiment has been described. Note that the configuration described above with reference to FIG. 1 is merely an example, and the functional configuration of the information processing device 10 according to the present embodiment is not limited to such an example. For example, the information processing device 10 may not necessarily include all of the configurations illustrated in FIG. 1, and each configuration such as the display unit 130 may be included in another device different from the information processing device 10. The functional configuration of the information processing device 10 according to the present embodiment can be flexibly modified according to specifications and operations.

In addition, an arithmetic device such as a Central Processing Unit (CPU) may perform the function of each component element by reading a control program from a storage medium such as the ROM or RAM storing the control programs in which process procedures implementing these functions are described, and interpreting and executing the program. Therefore, it is possible to appropriately change the configuration to be used according to technical level each time the present embodiment is carried out. Furthermore, an example of a hardware configuration of the information processing device 10 will be described later.

1.2. Details of Functions

Next, functions of the information processing device 10 according to the present embodiment will be described in detail. One of the features of the control unit 200 of the information processing device 10 according to the present embodiment is to determine one main subject from the captured moving image by using the learning model, and appropriately focus on the determined main subject.

First, a method of generating the learning model according to the present embodiment will be described with reference to FIG. 2. The learning model of the present embodiment is a model for identifying a main subject portion in the captured image. The learning model includes an input layer to which the captured image (or feature amount of the captured image) is input, an output layer, a first element that belongs to a layer being any of the input layer to the output layer, other than the output layer, and a second element whose value is calculated on the basis of the first element and a weight of the first element. The learning model causes the information processing device 10 to function to output, from the output layer, data (e.g., data indicating the main subject degree which is described later) indicating a portion recognized as the main subject in the captured image, according to the captured image (or the feature amount of the captured image) input to the input layer.

Note that a generation device (e.g., the information processing device 10 such as a server device) that generates the learning model of the present embodiment may generate the above-described learning model by using any learning algorithm. For example, the generation device may generate the learning model of the present embodiment by using a learning algorithm such as a Neural Network (NN), a Support Vector Machine (SVM), clustering, or reinforcement learning. In an example, it is assumed that the generation device generates the learning model of the present embodiment by using the NN. In this case, the learning model may have the input layer that includes one or more neurons, an intermediate layer that includes one or more neurons, and the output layer that includes one or more neurons.

Here, it is assumed that the learning model according to the present embodiment is implemented by a regression model indicated by "$y=a_1*x_1+a_2*x_2+ \ldots +a_i*x_i$". In this case, the first element included in the learning model corresponds to input data ($x_i$) such as $x_1$ or $x_2$. Furthermore, the weight of the first element corresponds to a coefficient $a_i$ corresponding to $x_i$. Here, the regression model can be regarded as a simple perceptron having an input layer and an output layer. When each model is regarded as the simple perceptron, the first element can be regarded to correspond to any node in the input layer, and the second element can be regarded as a node in the output layer.

Furthermore, it is assumed that the learning model according to the present embodiment is implemented by the NN, such as a Deep Neural Network (DNN), having one or more intermediate layers. In this case, the first element included in the learning model corresponds to any node included in the input layer or any of the intermediate layers. In addition, the second element corresponds to a node in the next layer that is a node to which a value is transmitted from a node corresponding to the first element. In addition, the weight of the first element corresponds to a connection coefficient that is a weight considered for a value transmitted from the node corresponding to the first element to the node corresponding to the second element.

The main subject degree is calculated using the learning model having any structure such as the regression model or the NN described above. More specifically, in the learning model, the coefficient is set to output the main subject degree for each predetermined area of a captured image when the captured image is input. The learning model according to the present embodiment may be a model generated on the basis of a result obtained by repeating input and output of data.

Note that, in the above example, the learning model according to the present embodiment is a model (referred to as a model X) that outputs the main subject degree for each predetermined area of the captured image when the captured image is input. However, the learning model according to the present embodiment may be a model generated on the basis of a result obtained by repeating input and output of data to and from the model X. For example, the learning model according to the present embodiment may be a learning model (referred to as a model Y) in which the captured image is input and the main subject degree output from the model X is output. Alternatively, the learning model according to the present embodiment may be a learning model in which the captured image is input and the main subject degree output from the model Y is output.

Figure 2:
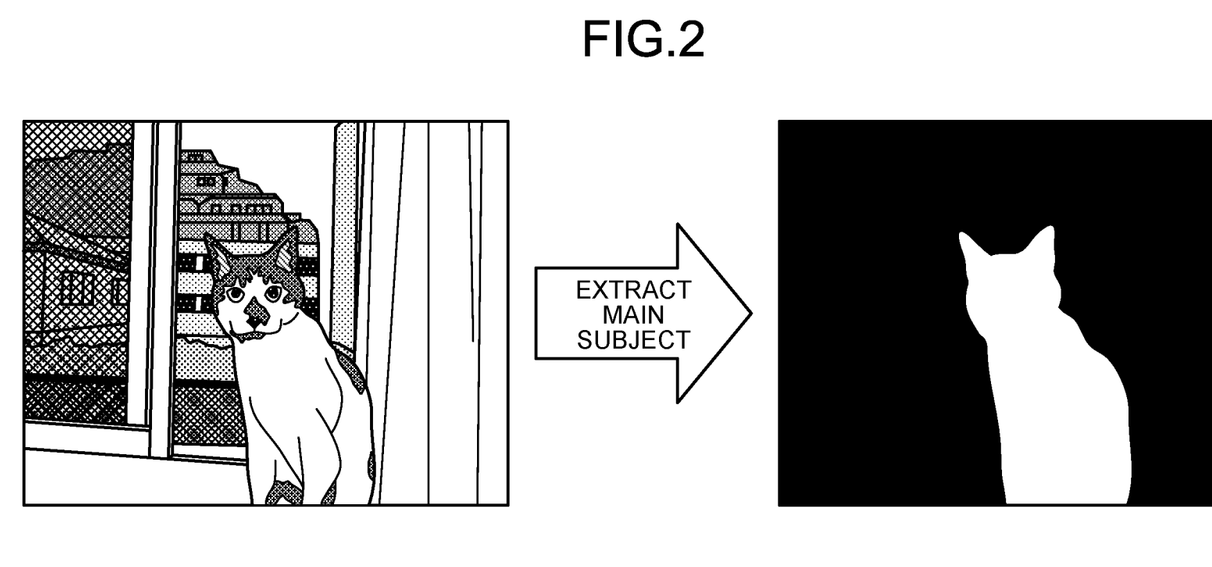
FIG. 2 is a diagram illustrating an example of extraction of a main subject object according to the embodiment.

FIG. 2 is a diagram illustrating an example of extraction of a main subject object according to the present embodiment. The left side of FIG. 2 is a captured image of a cat in a living room with a window from which the outside view can be seen. On the other hand, the right side of FIG. 2 is an image obtained by extracting the cat that is the main subject. In this manner, the learning model is generated by extracting, from various captured images, objects, such as persons, plants and animals, buildings, moving objects including cars and airplanes, characters and signboards, toys, electrical appliances, food, clothing, accessories, astronomical objects, and the like, that can be the main subject, and being trained to learn images in which the objects that can be the main subjects are captured and the mask images in which the main subject portions are masked. Such a learning model makes it possible to determine an appropriate main subject from the captured moving image (image). Furthermore, the depth of the subject that is acquired by the sensor unit 180 may be used as the training data of the learning model. This configuration makes it possible to generate the learning model in consideration of the distance to the subject. Furthermore, it is also possible to perform deep learning by a Recurrent Neural Network (RNN) in which time series data including captured images of past frames of the captured moving image is input.

Figure 3:
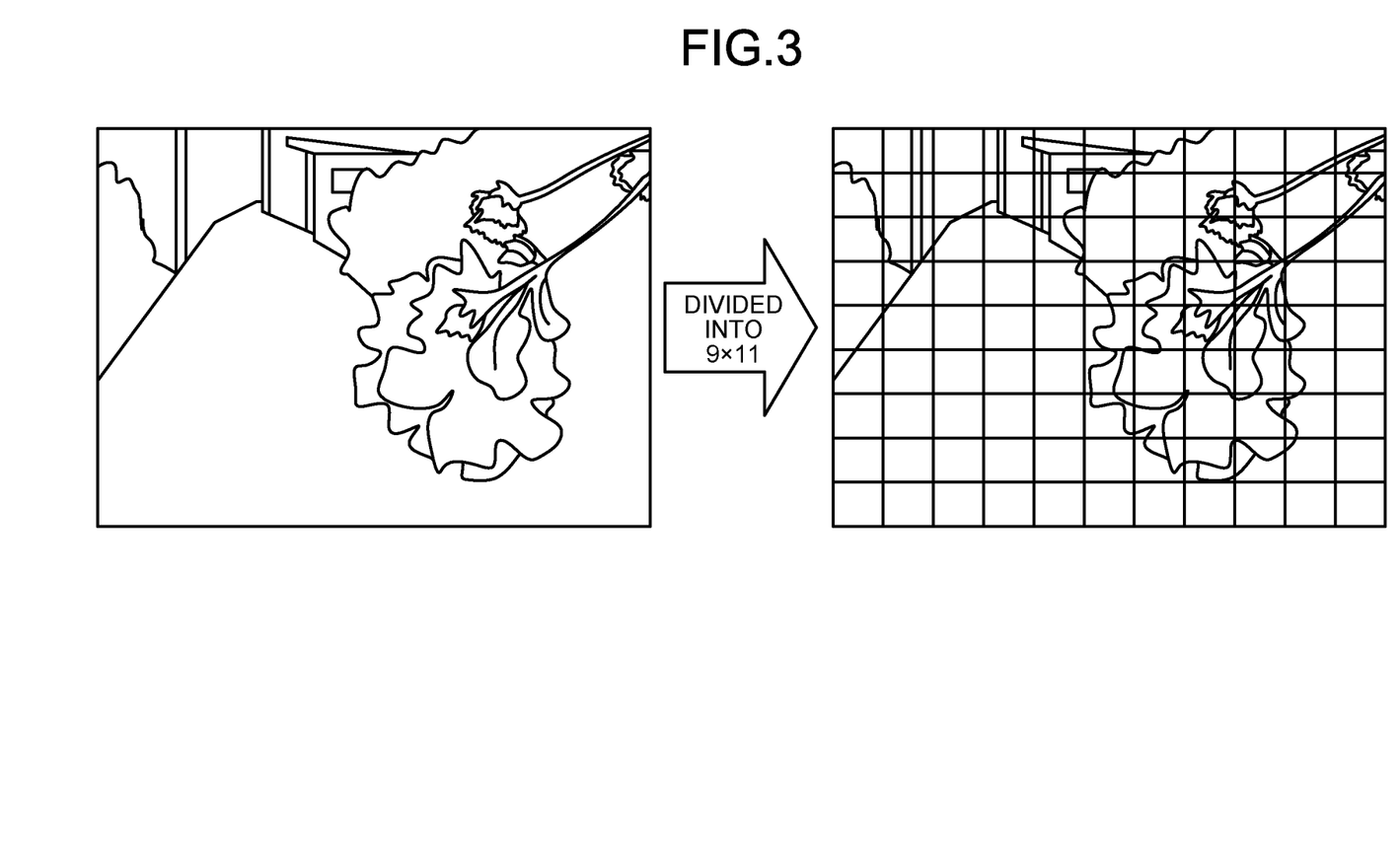
FIG. 3 is a diagram illustrating an example of segmentation for generating a main subject MAP according to the embodiment.

Next, a method of generating a main subject MAP for determining the main subject from a captured image will be described with reference to FIGS. 3 and 4. FIG. 3 is a diagram illustrating an example of segmentation for generating the main subject MAP according to the present embodiment. In the present embodiment, the main subject area is determined by calculating the main subject degree for each predetermined area of the captured image and generating the main subject MAP in which each predetermined area and the main subject degree are mapped. As illustrated in FIG. 3, each predetermined area is determined, for example, by dividing the captured image into 9 rows×11 columns. Note that the number of areas to be divided is not limited to 9 rows×11 columns, and the number of pixels included in the areas may be constant or different. For example, the image may be divided so that the number of pixels included in the respective areas is constant, and pixels corresponding to the number of pixels not included in the areas may be included in areas on the outer edge of the captured image.

Figure 4:
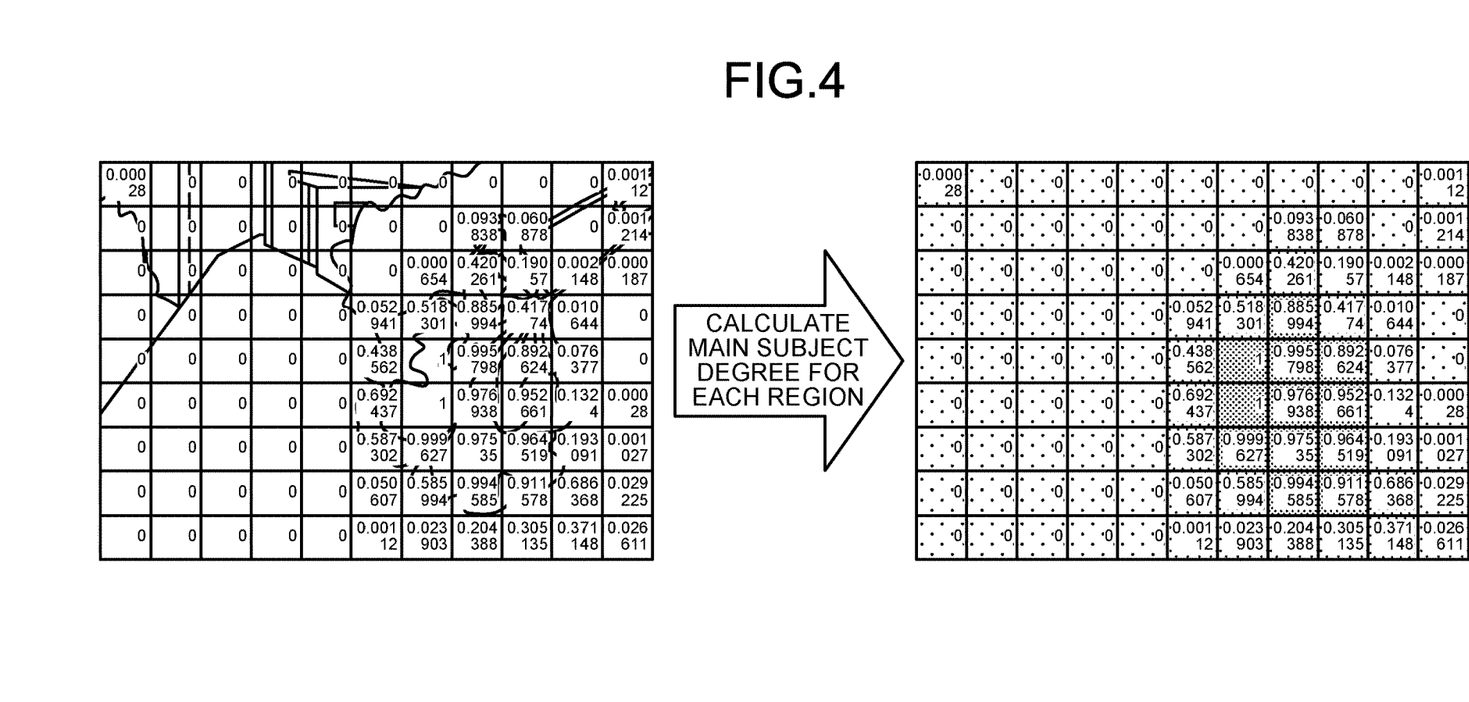
FIG. 4 is a diagram illustrating an example of generation of the main subject MAP according to the embodiment.

FIG. 4 is a diagram illustrating an example of generation of the main subject MAP according to the present embodiment. Using the learning model generated as described in FIG. 2, the main subject degree is calculated for each area of the captured image divided in FIG. 3, and the main subject MAP is generated. The right side of FIG. 4 is an example of the generated main subject MAP. As illustrated on the right side of FIG. 4, the main subject MAP indicates the main subject degree (0 to 1) calculated for each area. In the example of FIG. 4, an area including "flower" in the captured image shows high main subject degree. Note that, in the example of FIG. 4, the areas having high main subject degree are gathered at one place, but some captured images may have dispersed areas of high main subject degree or have no area of high main subject degree.

Figure 5:
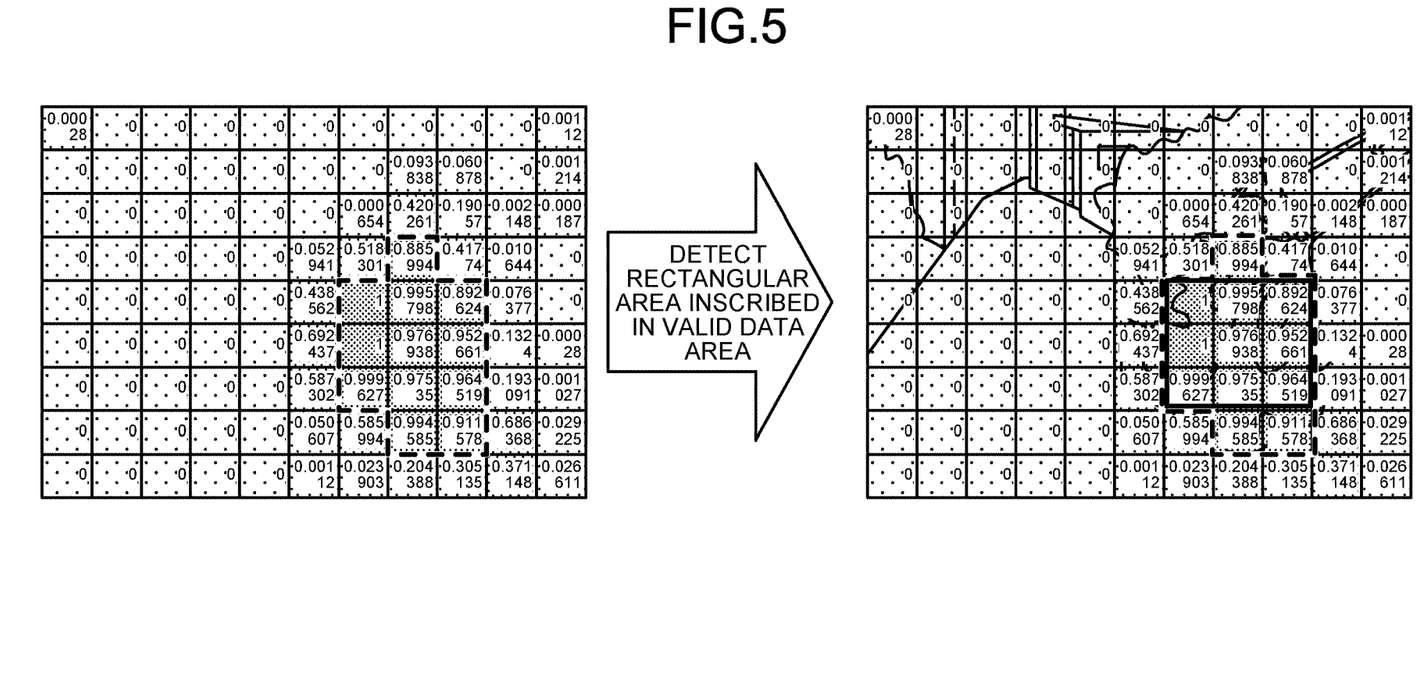
FIG. 5 is a diagram illustrating an example of detection of a rectangular area according to the embodiment.

Next, detection of a rectangular area for determining the main subject area from the main subject MAP will be described. FIG. 5 is a diagram illustrating an example of detection of the rectangular area according to the present embodiment. As illustrated on the left side of FIG. 5, a predetermined area having a main subject degree equal to or larger than the predetermined threshold (e.g., 0.7) is determined as the valid data area, and adjacent valid data areas are treated together as one valid data area. In the example on the left side of FIG. 5, the adjacent valid data areas are combined and put together into the one valid data area, but are put together into a plurality of valid data areas having different sizes in some cases. Furthermore, the valid data area can be determined in a case where the main subject degree of a target area is equal to or larger than the predetermined threshold continuously for a certain period of time (e.g., two seconds). In this case, the main subject MAPs is generated for each of the captured images of a plurality of frames, and the valid data area is determined by, for example, processing the plurality of main subject MAPs in chronological order.

Then, as illustrated on the right side of FIG. 5, the rectangular area inscribed in the valid data area is detected. When there is a plurality of valid data areas, the rectangular area is detected in each of the valid data areas. The detected rectangular area is determined as the main subject area. Note that, in detection of the rectangular area, a detection condition (e.g., upper limit or lower limit) can be further provided for the width, height, area, and the like of the rectangular area. This is because the rectangular area that is too small or too large is not appropriate as the main subject area to be brought into focus.

In addition, in order to bring the main subject area into focus, it is necessary to determine a single main subject area. Therefore, in a case where there is a plurality of main subject areas to be determined, for example, one main subject area having the largest area and/or closest to the information processing device 10 is determined from the plurality of main subject areas. Note that, in determination of the closest main subject area, the distance between the information processing device 10 and each main subject area is measured by the sensor unit 180 such as a ToF sensor to determine the closest main subject area. Alternatively, the closest main subject area may be determined by using depth information acquired from a phase-contrast image generated by the image capture unit 120. Then, the determined one main subject area is brought into focus.

Figure 6:
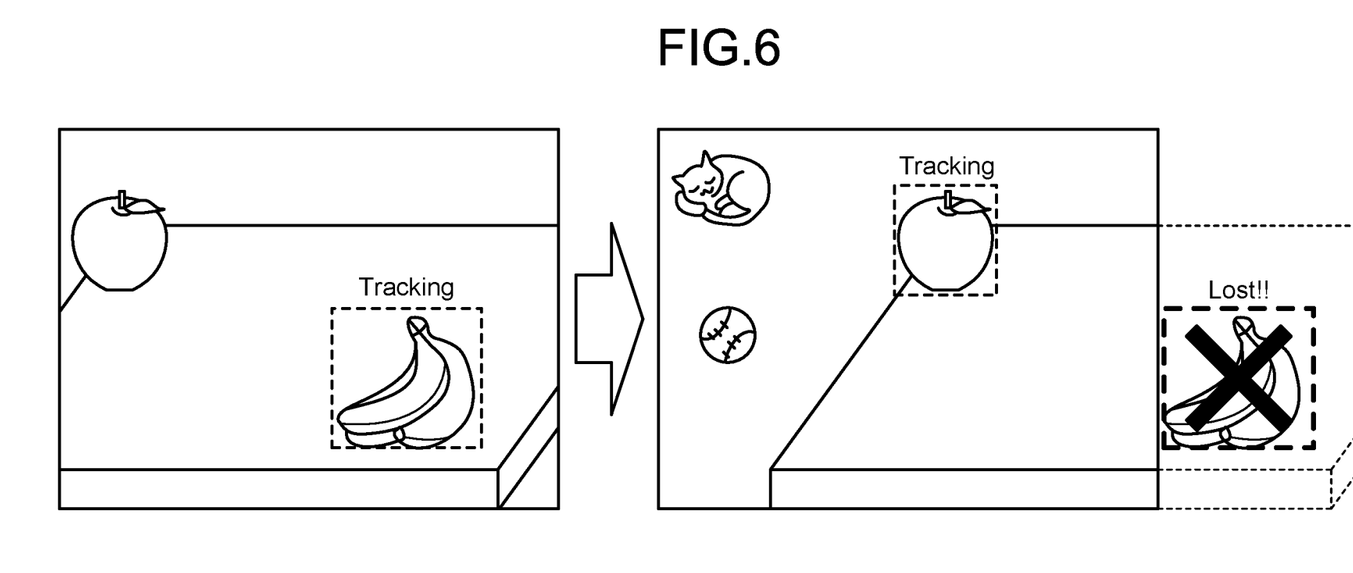
FIG. 6 is a diagram illustrating an example of object tracking according to the embodiment.

Next, tracking of the main subject in the main subject area brought into focus will be described. FIG. 6 is a diagram illustrating an example of object tracking according to the present embodiment. In the example of FIG. 6, first, as illustrated on the left side of FIG. 6, a bunch of bananas is determined as the main subject by the learning model, and the main subject surrounded by a broken line is tracked by the tracking unit 170. Even if the position of the main subject in a camera frame is moved by, for example, moving the information processing device 10 by the camera operator, the tracking unit 170 continues to track the main subject (the bunch of bananas). Therefore, the main subject is kept in focus. However, as illustrated on the right side of FIG. 6, when the main subject is out of frame (the main subject is lost), another main subject area (apple) is determined and tracked. Note that, for the loss of the main subject, it can be considered that the main subject is hidden by another object or the main subject degree of the main subject area is significantly reduced. In this case as well, another main subject area is determined. Note that the loss of the main subject can be postponed to a certain degree. For example, instead of determining the another main subject area immediately after the loss of the main subject occurs, the another main subject area can be determined when the loss of the main subject continues for a certain period of time (e.g., three seconds).

1.3. Functional Flow

Figure 7:
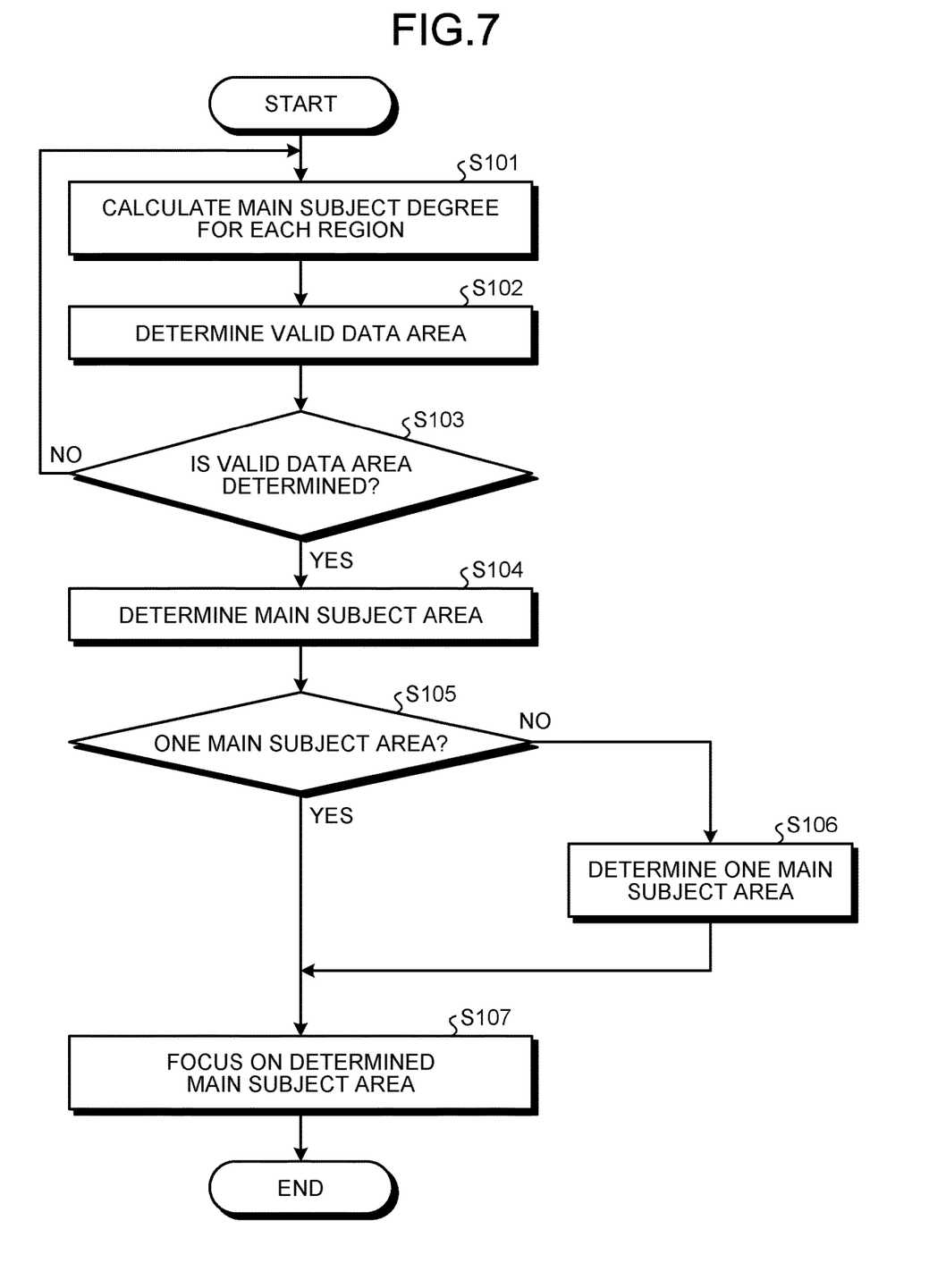
FIG. 7 is a flowchart illustrating a main subject AF process according to the embodiment.

Next, a procedure of a main subject AF process according to the present embodiment will be described with reference to FIG. 7. FIG. 7 is a flowchart illustrating the main subject AF process according to the present embodiment. The present process is, for example, a process that is triggered by temporarily storing, in the RAM, digital data obtained by converting a moving image obtained by capturing a subject by the image capture unit 120 of the information processing device 10, and that determines the main subject and brings the determined main subject into focus.

As illustrated in FIG. 7, first, the calculation unit 140 of the information processing device 10 calculates the main subject degree for each predetermined area of an image (captured image) of one frame of the moving image captured by the image capture unit 120 (Step S101). The predetermined area is determined by dividing the captured image into a predetermined number of grids (e.g., 9 rows×11 columns).

Next, the determination unit 150 of the information processing device 10 determines, as the valid data area, the predetermined area having a main subject degree equal to or larger than the predetermined threshold, calculated in Step S101 (Step S102). At this time, the valid data area cannot be determined in some cases, since the captured image does not particularly include an object that can be the main subject and there is no area having a main subject degree equal to or larger than the predetermined threshold. In addition, a predetermined number of captured images including past frames can be processed in chronological order to determine, as the valid data area, the predetermined area having a main subject degree equal to or larger than the predetermined threshold continuously for a certain period of time. Therefore, the valid data area including the main subject to be brought into focus can be further appropriately determined.

When the determination unit 150 cannot determine the valid data area (Step S103: No), the process is repeated from Step S101 for an image of the next frame of the captured moving image. At this time, the captured image does not include the object that can be the main subject, and therefore, it is also possible to bring the center area of the captured image into focus.

On the other hand, when the determination unit 150 can determine the valid data area (Step S103: Yes), the determination unit 150 detects the rectangular area inscribed in the valid data area and satisfying a predetermined detection condition, and determines the rectangular area as the main subject area (Step S104). The rectangular area satisfying the predetermined detection condition is, for example, a rectangular area that has a width equal to or larger than a predetermined width and a height equal to or larger than a predetermined height. Therefore, there may be a plurality of rectangular areas satisfying the detection condition, and a plurality of main subject areas may be determined, in some cases.

When there is a plurality of main subject areas determined in Step S104 (Step S105: No), the determination unit 150 determines one main subject area from the plurality of main subject areas (Step S106). The one main subject area is, for example, a main subject area that has the largest area. Alternatively, the main subject area may be a main subject area that is closest to the information processing device 10.

When the one main subject area is determined in Step S106, or when one main subject area is determined in Step S104 (Step S105: Yes), the focusing unit 160 of the information processing device 10 focuses on the determined one main subject area (Step S107). After Step S107, the present process ends.

Figure 8:
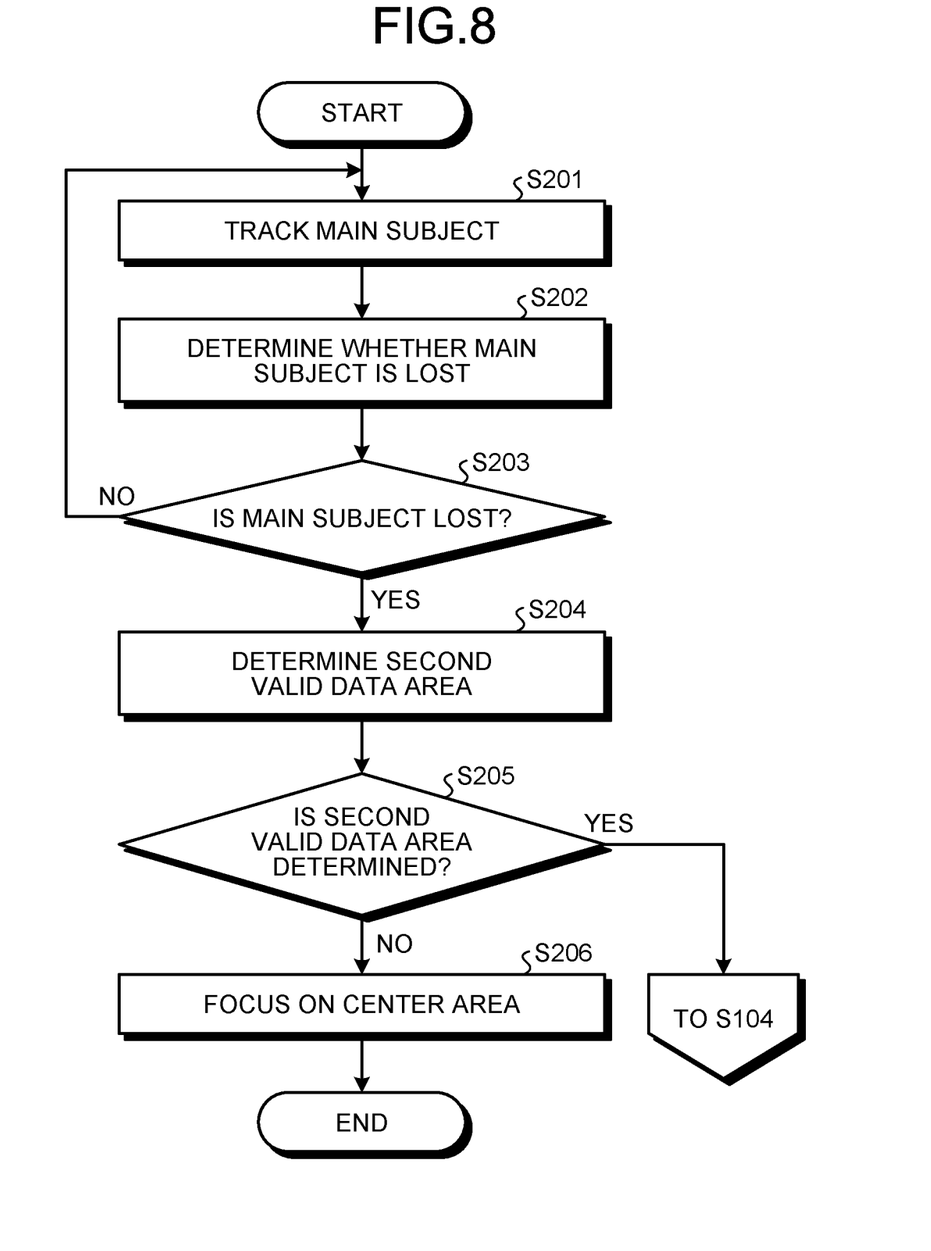
FIG. 8 is a flowchart illustrating a main subject tracking process according to the embodiment.

Next, a procedure of a main subject tracking process according to the present embodiment will be described with reference to FIG. 8. FIG. 8 is a flowchart illustrating the main subject tracking process according to the present embodiment. The present process is a process that is triggered by determination of the main subject area in the main subject AF process of FIG. 7 and that tracks the main subject to be brought into focus.

As illustrated in FIG. 8, first, the tracking unit 170 of the information processing device 10 tracks the main subject included in the one main subject area determined in Step S104 or Step S106 (Step S201). The tracking described herein is to monitor the main subject in the camera frame that is moved by, for example, moving the information processing device 10 by the camera operator. In other words, monitoring the main subject in the captured image for each frame of the moving image captured by the image capture unit 120 is continued.

Next, the tracking unit 170 determines whether the main subject being tracked is lost (Step S202). Note that it is also possible to process a predetermined number of captured images including past frames in chronological order to determine that the main subject has been lost when the main subject has been lost continuously for a certain period of time.

When the main subject is not lost (Step S203: No), the process returns to Step S201, and the tracking unit 170 tracks the main subject. On the other hand, when the main subject is lost (Step S203: Yes), the determination unit 150 of the information processing device 10 determines a second valid data area that is different from the valid data area including the main subject having been tracked and that has a main subject degree equal to or larger than the predetermined threshold (Step S204).

When the second valid data area can be determined (Step S205: Yes), the process proceeds to Step S104 in FIG. 7, a rectangular area inscribed in the second valid data area determined in Step S204 is detected, and the rectangular area is determined as the main subject area. Then, the process proceeds to Step S105.

On the other hand, when there is no area having a main subject degree equal to or larger than the predetermined threshold and the second valid data area cannot be determined (Step S205: No), the focusing unit 160 of the information processing device 10 focuses on the center area of the captured image (Step S206). After Step 206, the present process ends.

2. EXAMPLE OF HARDWARE CONFIGURATION

Figure 9:
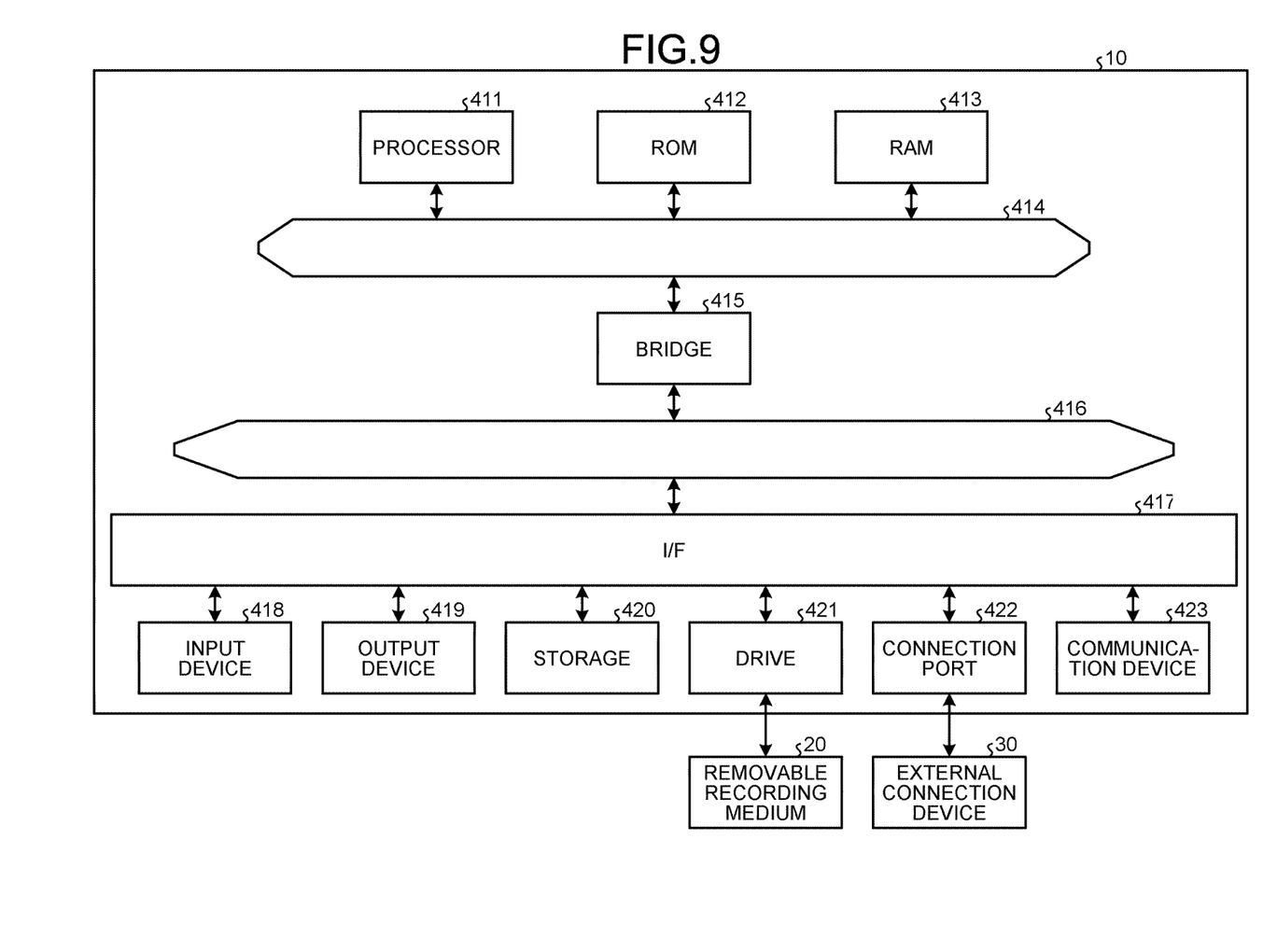
FIG. 9 is a block diagram illustrating an example of the hardware configuration of the information processing device 10 according to the embodiment.

Next, an example of the hardware configuration of the information processing device 10 according to the present embodiment will be described. FIG. 9 is a block diagram illustrating an example of the hardware configuration of the information processing device 10 according to the present embodiment. Referring to FIG. 9, the information processing device 10 includes, for example, a processor 411, ROM 412, RAM 413, a host bus 414, a bridge 415, an external bus 416, an interface 417, an input device 418, an output device 419, a storage 420, a drive 421, a connection port 422, and a communication device 423. Note that the hardware configuration illustrated here is merely an example, and some of the component elements may be omitted. In addition, a component element other than the component elements illustrated in the drawing may be further included.

(Processor 411)

The processor 411 functions as an arithmetic processing device or a control device, for example, and controls all or part of the operation of component elements, on the basis of various programs or various data (including the learning model) recorded in the ROM 412, the RAM 413, the storage 420, or a removable recording medium 20.

(ROM 412 and RAM 413)

The ROM 412 is a unit that stores a program read by the processor 411, data (including the learning model) used for calculation, and the like. The RAM 413 temporarily or permanently stores, for example, a program read by the processor 411, various parameters that appropriately change when the program is executed, and the like.

(Host Bus 414, Bridge 415, External Bus 416, and Interface 417)

The processor 411, the ROM 412, and the RAM 413 are mutually connected, for example, via the host bus 414 configured to transmit data at high speed. Meanwhile, the host bus 414 is connected to, for example, the external bus 416 configured to transmit data at relatively low speed via the bridge 415. In addition, the external bus 416 is connected to various component elements via the interface 417.

(Input Device 418)

The input device 418 employs, for example, a mouse, a keyboard, a touch panel, a button, a switch, and a lever. Furthermore, for the input device 418, a remote controller configured to transmit a control signal by using infrared rays or another radio wave is sometimes used. Furthermore, the input device 418 includes a voice sound input device such as a microphone.

(Output Device 419)

The output device 419 is a device that is configured to visually or audibly notify the user of acquired information, for example, a display device such as a Cathode Ray Tube (CRT), LCD, or organic EL, an audio output device such as a speaker or headphone, a printer, a mobile phone, or a facsimile. Furthermore, the output device 419 according to the present embodiment includes various vibrating devices configured to output tactile stimulation.

(Storage 420)

The storage 420 is a device for storing various data. The storage 420 employs, for example, a magnetic storage device such as a hard disk drive (HDD), a semiconductor storage device, an optical storage device, a magneto-optical storage device, or the like.

(Drive 421)

The drive 421 is, for example, a device that reads information recorded on the removable recording medium 20 such as a magnetic disk, optical disk, magneto-optical disk, or semiconductor memory or that writes information to the removable recording medium 20.

(Removable Recording Medium 20)

The removable recording medium 20 is, for example, a DVD medium, a Blu-ray (registered trademark) medium, an HD DVD medium, various semiconductor storage media, or the like. As a matter of course, the removable recording medium 20 may be, for example, an IC card with a non-contact IC chip, an electronic device, or the like.

(Connection Port 422)

The connection port 422 is, for example, a Universal Serial Bus (USB) port, an IEEE1394 port, a Small Computer System Interface (SCSI), an RS-232C port, or a port for connecting an external connection device 30 such as optical audio terminal.

(External Connection Device 30)

The external connection device 30 is, for example, a printer, a portable music player, a digital camera, a digital camcorder, an IC recorder, or the like.

(Communication Device 423)

The communication device 423 is a communication device for connection to a network, and is, for example, a communication card for wired or wireless LAN, Bluetooth (registered trademark), or Wireless USB (WUSB), an optical communication router, an Asymmetric Digital Subscriber Line (ADSL) router, various communication routers, or the like.

3. CONCLUSION

As described above, the information processing device 10 includes the image capture unit 120 that captures an image of a subject and converts the image into digital data to generate a captured image, the calculation unit 140 that calculates, for each predetermined area of the captured image, a probability that the subject included in the predetermined area is a main subject desired to be captured by the camera operator, the determination unit 150 that determines the predetermined area in which the probability exceeds a predetermined threshold as a valid data area and determines a main subject area on the basis of the valid data area, and the focusing unit 160 that focuses on the determined main subject area.

Accordingly, it is possible to appropriately bring the main subject into focus.

Preferred embodiments of the present disclosure have been described above in detail with reference to the accompanying drawings, but the technical scope of the present disclosure is not limited to these examples. A person skilled in the art may obviously find various alternations and modifications within the technical concept described in claims, and it should be understood that the alternations and modifications will naturally come under the technical scope of the present disclosure.

Furthermore, the effects descried herein are merely explanatory or exemplary effects, and not limitative. In other words, the technology according to the present disclosure can achieve other effects that are apparent to those skilled in the art from the description herein, along with or instead of the above effects.

Note that the present technology can also employ the following configurations.

(1)

An information processing device including:
    an image capture unit that captures an image of a subject and converts the image into digital data to generate a captured image;
    a calculation unit that calculates, for each predetermined area of the captured image, a probability that the subject included in the predetermined area is a main subject desired to be captured by a camera operator;
    a determination unit that determines the predetermined area in which the probability exceeds a predetermined threshold as a valid data area and determines a main subject area based on the valid data area; and
    a focusing unit that focuses on the determined main subject area.

(2)

The information processing device according to (1), wherein calculation of the probability by the calculation unit is performed by using a learning model in which the captured image is input and the probability is output.

(3)

The information processing device according to (1), wherein
    determination of the main subject area by the determination unit includes:
    combining the adjacent valid data areas;
    detecting a rectangular area inscribed in the obtained valid data area; and
    determining the rectangular area as the main subject area.

(4)

The information processing device according to (3), wherein
    determining, by the determination unit, the rectangular area as the main subject area includes
    determining, as the main subject area, the rectangular area in which at least one of a width, a height, and an area satisfies a predetermined condition.

(5)

The information processing device according to any one of (1) to (4), wherein
    when there is a plurality of the main subject areas determined by the determination unit, the determination unit further determines, from the plurality of the main subject areas, one first main subject area satisfying at least one of the largest area and the closest to the information processing device, and
    the main subject area brought into focus by the focusing unit is the first main subject area.

(6)

The information processing device according to any one of (1) to (5), wherein
  determination of the valid data area by the determination unit includes
    determining the predetermined area in which the probability exceeds the predetermined threshold for a certain period of time, as the valid data area.

(7)

The information processing device according to any one of (1) to (6), further including a tracking unit that tracks the main subject included in the determined main subject area.

(8)

The information processing device according to (7), wherein, when the main subject being tracked is out of a frame or when the probability of the main subject area corresponding to the main subject being tracked is equal to or smaller than the predetermined threshold for a certain period of time, the determination unit further determines a second main subject area based on the valid data area.

(9)

The information processing device according to (8), wherein, when the second main subject area is not determined, the focusing unit further focuses on a predetermined center area of the captured image.

(10)

The information processing device according to (5), further including
  a sensor unit that measures a distance to the subject,
    wherein the closest first main subject area determined by the determination unit is determined based on the measured distance.

(11)

The information processing device according to (5), wherein
  the image capture unit further generates a phase-contrast image for the subject, and
  the closest first main subject area determined by the determination unit is determined based on depth information acquired from the phase-contrast image.

(12)

The information processing device according to (2), wherein a distance to an object that can be the main subject is further input to the learning model used by the calculation unit.

(13)

A method for performing,
by an information processing device, a process including:
  capturing an image of a subject and converts the image into digital data to generate a captured image;
  calculating, for each predetermined area of the captured image, a probability that the subject included in the predetermined area is a main subject desired to be captured by a camera operator;
  determining the predetermined area in which the probability exceeds a predetermined threshold as a valid data area;
  determining a main subject area based on the valid data area; and
  focusing on the determined main subject area.

(14)

A program causing
an information processing device to perform a process including:
  capturing an image of a subject and converts the image into digital data to generate a captured image;
  calculating, for each predetermined area of the captured image, a probability that the subject included in the predetermined area is a main subject desired to be captured by a camera operator;
  determining the predetermined area in which the probability exceeds a predetermined threshold as a valid data area;
  determining a main subject area based on the valid data area; and
  focusing on the determined main subject area.

REFERENCE SIGNS LIST

10 INFORMATION PROCESSING DEVICE
110 STORAGE UNIT
120 IMAGE CAPTURE UNIT
130 DISPLAY UNIT
140 CALCULATION UNIT
150 DETERMINATION UNIT
160 FOCUSING UNIT
170 TRACKING UNIT
180 SENSOR UNIT
200 CONTROL UNIT

The invention claimed is:

1. An information processing device, comprising:
  an image capture unit configured to:
    capture an image; and
    generate a captured image based on a conversion of the image into digital data;
  a calculation unit configured to calculate a probability that a first subject included in a predetermined area of the captured image is a main subject, wherein
    the main subject corresponds to a second subject desired to be captured by a camera operator,
    the predetermined area is included in a plurality of predetermined areas of a frame of the captured image,
    the probability is included in a plurality of probabilities, and
    the plurality of probabilities is associated with the plurality of predetermined areas;
  a determination unit configured to:
    determine the predetermined area as a first valid data area of the frame of the captured image, wherein the predetermined area is determined as the first valid data area in an event the probability exceeds a predetermined threshold;
    combine the first valid data area with at least one adjacent valid data area of the frame of the captured image; and
    determine a first main subject area of the frame of the captured image based on the combination of the first valid data area and the at least one adjacent valid data area; and
  a focusing unit configured to focus on the determined first main subject area.

2. The information processing device according to claim 1, wherein
  the calculation unit is further configured to calculate the probability based on a learning model,
  wherein a first input of the learning model is the captured image and an output of the learning model is the probability.

3. The information processing device according to claim 1, wherein the determination unit is further configured to:

detect a rectangular area based on the combination of the first valid data area and the at least one adjacent valid data area; and determine the rectangular area as the first main subject area.

4. The information processing device according to claim 3, wherein at least one of a width of the rectangular area, a height of the rectangular area, and an area of the rectangular area satisfies a predetermined condition.

5. The information processing device according to claim 1, wherein the determination unit is further configured to determine a plurality of the main subject areas, the first main subject area is included in the plurality of the main subject areas, and the first main subject area corresponds to at least one of a largest main subject area among the plurality of the main subject areas, and a closest main subject area closest to the information processing device among the plurality of the main subject areas.

6. The information processing device according to claim 1, wherein the probability exceeds the predetermined threshold for a certain period of time.

7. The information processing device according to claim 1, further including a tracking unit configured to track the first subject included in the determined first main subject area.

8. The information processing device according to claim 7, wherein the determination unit is further configured to determine a second main subject area based on one of the first subject being tracked is out of the frame or the probability of the first main subject area being equal to or smaller than the predetermined threshold for a certain period of time, and the second main subject area is determined based on a second valid data area.

9. The information processing device according to claim 8, wherein the focusing unit is further configured to focus on a predetermined center area of the frame of the captured image, in an event the second main subject area is not determined.

10. The information processing device according to claim 5, further comprising:

a sensor unit configured to measure a distance between the information processing device and the first subject, wherein the closest main subject area is determined based on the measured distance.

11. The information processing device according to claim 5, wherein the image capture unit is further configured to generate a phase-contrast image for the first subject, and the closest main subject area is determined based on depth information of the phase-contrast image.

12. The information processing device according to claim 2, wherein a second input of the learning model corresponds to a distance between the first subject and the information processing device.

13. A method, comprising:

capturing an image;

generating a captured image based on a conversion of the image into digital data;

calculating a probability that a first subject included in a predetermined area of the captured image is a main subject, wherein the main subject corresponds to a second subject desired to be captured by a camera operator, the predetermined area is included in a plurality of predetermined areas of a frame of the captured image, the probability is included in a plurality of probabilities, and the plurality of probabilities is associated with the plurality of predetermined areas;

determining the predetermined area as a first valid data area of the frame of the captured image, wherein the predetermined area is determined as the first valid data area in an event the probability exceeds a predetermined threshold;

combining the first valid data area with at least one adjacent valid data area of the frame of the captured image;

determining a first main subject area of the frame of the captured image based on the combination of the first valid data area and the at least one adjacent valid data area; and focusing on the determined first main subject area.

14. A non-transitory computer-readable medium having stored thereon, computer-executable instructions which, when executed by a computer, cause the computer to execute operations, the operations comprising:

capturing an image;

generating a captured image based on a conversion of the image into digital data;

calculating a probability that a first subject included in a predetermined area of the captured image is a main subject, wherein the main subject corresponds to a second subject desired to be captured by a camera operator, the predetermined area is included in a plurality of predetermined areas of a frame of the captured image, the probability is included in a plurality of probabilities, and the plurality of probabilities is associated with the plurality of predetermined areas;

determining the predetermined area as a first valid data area of the frame of the captured image, wherein the predetermined area is determined as the first valid data area in an event the probability exceeds a predetermined threshold;

combining the first valid data area with at least one adjacent valid data area of the frame of the captured image;

determining a first main subject area of the frame of the captured image based on the combination of the first valid data area and the at least one adjacent valid data area; and focusing on the determined first main subject area.

* * * * *